Aug. 18, 1953      W. E. BICE, JR      2,649,308
BUMPER AND STEP AND TRAILER-HITCH UNIT
Filed Feb. 26, 1951      2 Sheets-Sheet 2
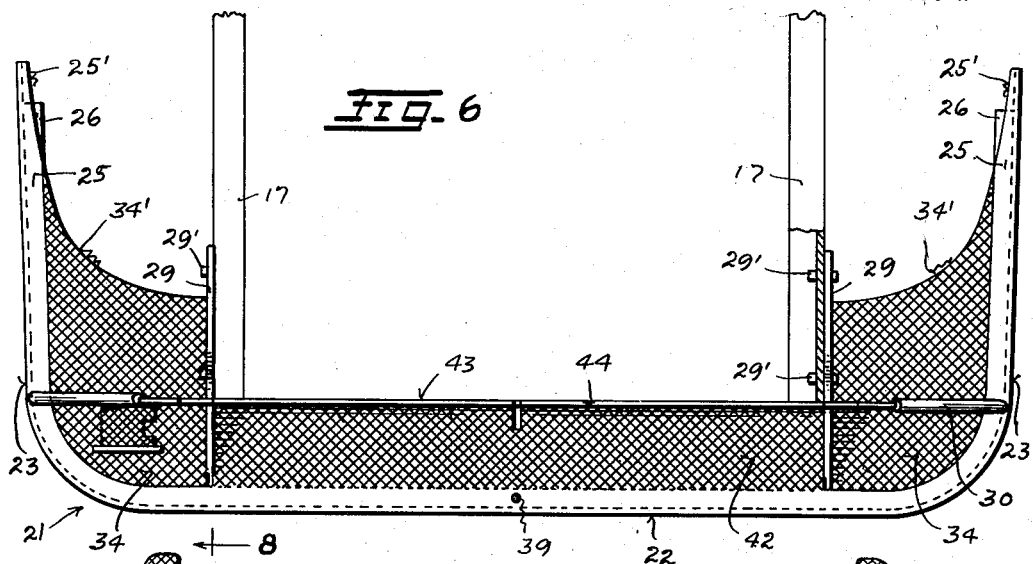
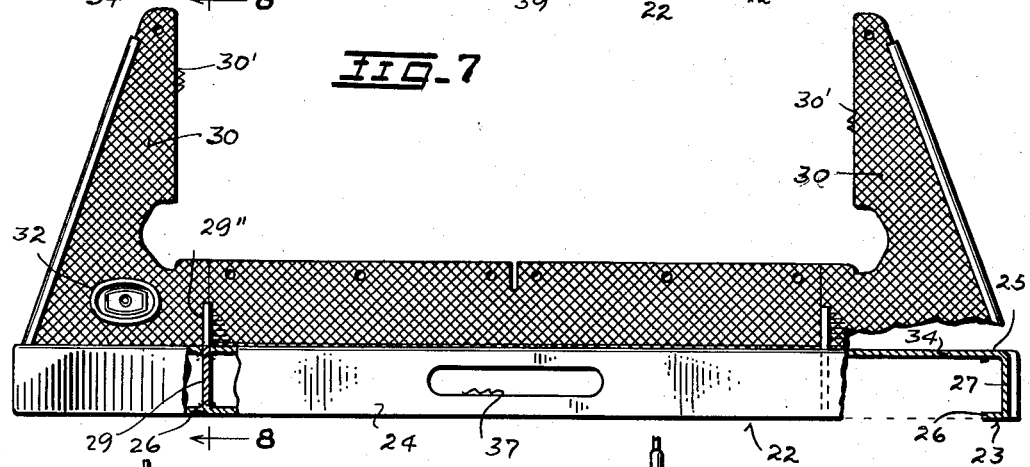
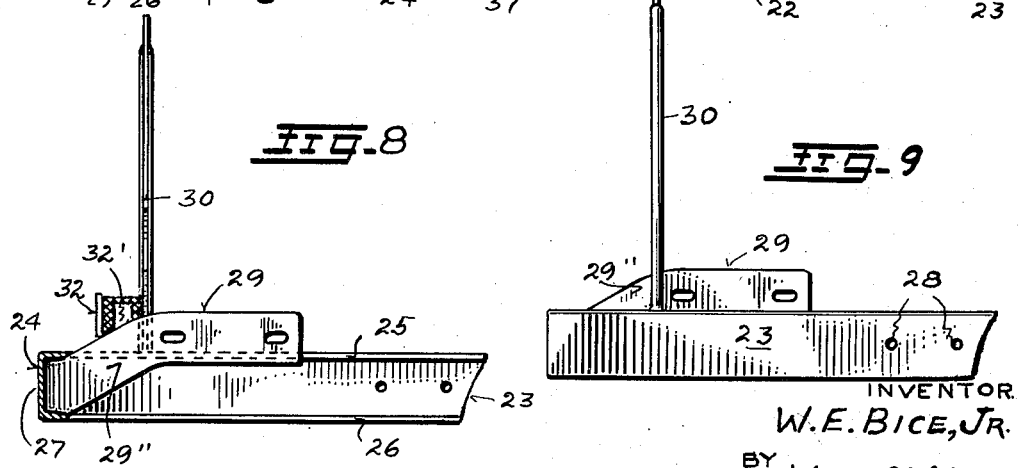
INVENTOR.
W. E. BICE, JR.
BY Henry N. Young
ATTORNEY Patented Aug. 18, 1953

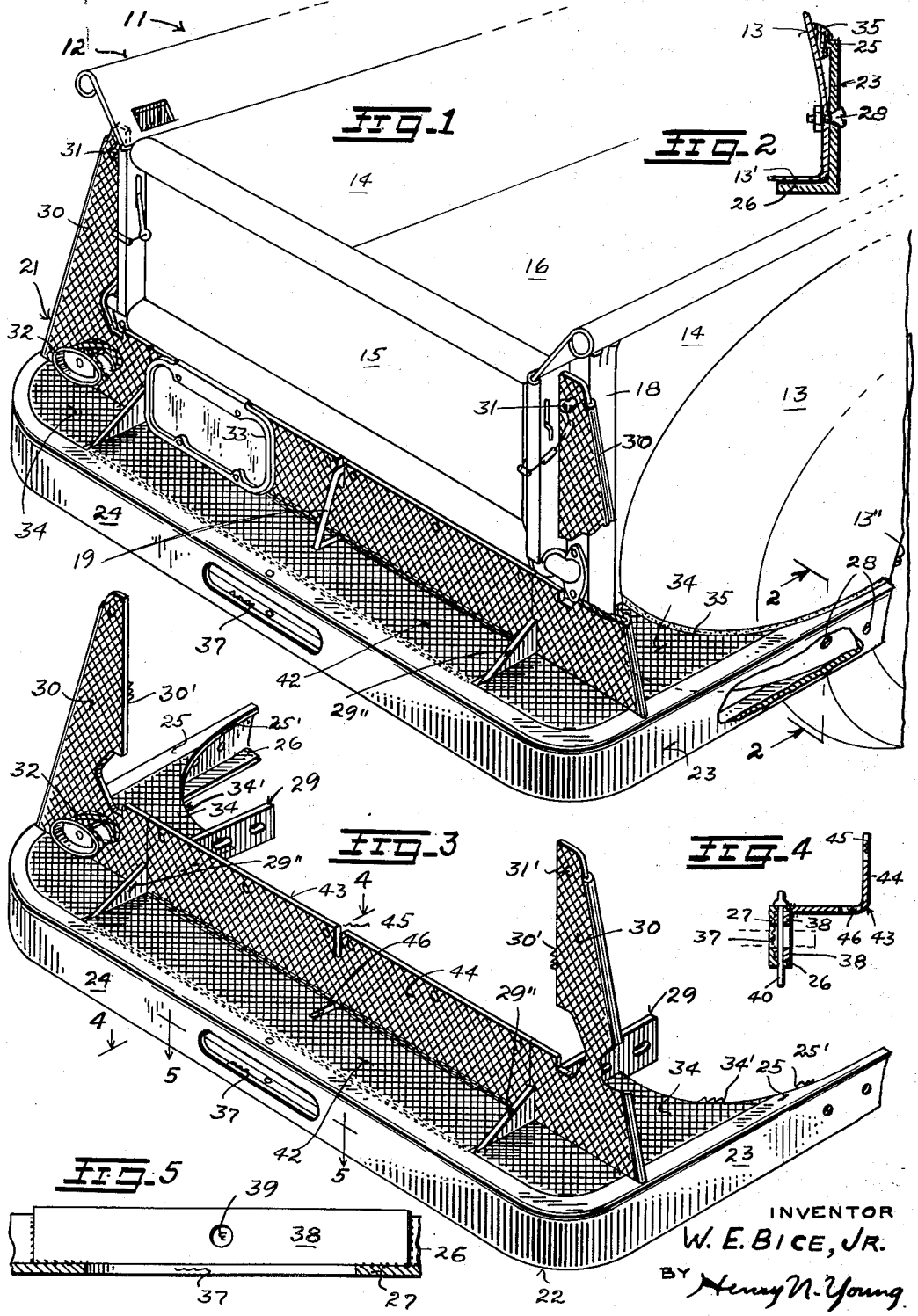

2,649,308

UNITED STATES PATENT OFFICE 2,649,308

BUMPER AND STEP AND TRAILER-HITCH UNIT

William E. Bice, Jr., Lockeford, Calif.

Application February 26, 1951, Serial No. 212,802

9 Claims. (Cl. 280—33.44)

1

The invention relates to a bumper and step and hitch unit for use on trucks of the "pick-up" type.

An object of the invention is to provide a unit of the character described which is arranged for its installation on a truck to dispose its step at a most convenient height and position for use in loading and unloading goods.

Another object is to provide a unit which fully protects the bottom portions of the rear fenders of a vehicle mounting it.

A further object is to provide a particularly simple and strong trailer-hitch connection as part of the unit.

An added object is to provide a unit of the character described which is arranged for its entirely bolted connection to the body of a mounting vehicle to facilitate its ready mounting and dismounting.

The invention possesses other objects and features of advantage, some of which, with the foregoing, will be set forth or be apparent in the following description of a typical embodiment of my invention, and in the accompanying drawings, in which, Figure 1 is a perspective view showing a present unit as mounted at the rear end of a truck body, portions of the structure being broken away.

Figure 2 is an enlarged fragmentary section taken at the line 2—2 in Figure 1.

Figure 3 is a perspective view of the unit per se.

Figure 4 is a section taken at the line 4—4 in Figure 3.

Figure 5 is an enlarged fragmentary sectional view taken at the plane of the line 5—5 in Figure 3.

Figure 6 is a plan view of the unit as attached to longitudinal body elements supporting the unit.

Figure 7 is a rear elevation of the unit, portions of its structure being broken away.

Figure 8 is a sectional elevation taken at the line 8—8 in Figure 7.

Figure 9 is a side view of the unit.

A unit embodying the features of my invention is particularly shown and arranged for mounting at the rear end of a vehicle 11 having a body or bed box 12 provided between rear wheel-receiving fenders 13. The present open-bed box 12 has sides 14 and a rear tail gate 15 which is hinged to the box bottom 16 at its rear end for its removal or its lowering to provide an extension of the bed bottom in a usual manner. Longitudinal beams 17 (Figure 5) of the vehicle body frame support the box 12, and

2 are utilized as the primary support for a present unit 21.

The bumper bar portion of the present unit 21 comprises a one-piece U-shaped element 22 having side portions 23 arranged to receive the lower rear end portions of the fenders 13 between them, and connected by a rear cross-portion 24 of the element. Preferably, and as shown, the bumper bar 22 is of uniform channel section having its upper and lower flanges 25 and 26 directed inwardly in mutually parallel planes from the connecting web portion 27 of the element. A preferred installation of the side portions 23 of the bumper bar element 22 at the fenders 13 is one in which the bottom edge 13' at the rear of a fender may be disposed within the forward part of a bumper side 23 with said bottom edge resting upon the lower flange 26, the free edge of the bar flange 25 being appropriately cut away at 25' for complementarily receiving the opposed fender portion which may be releasably fixed to the web 27 by bolts 28. It will be understood that the fenders 13, being fixed parts of the vehicle structure, are thus positively supported at their rear ends by the side bar portions which also function to positively protect the fenders from beneath as well as laterally outwardly thereof. The bar sides 23 preferably extend forwardly to the line of the forward fender edges 13", as is particularly shown.

The rear bumper bar portion 24 is arranged for its direct support from the longitudinal body beams 17 by means of bracket plates 29 extending fixedly from the bumper bar in upright planes and in appropriately spaced relation to have forward portions thereof closely receive the rear end portions of the beams 17 between them and to which they may be secured by bolts 29'. As particularly shown, rear end portions of the bracket plates 29 are fitted within the space of the bar channel and the forward bracket portions are offset upwardly from the plane of the bumper bar by a distance which provides for a disposition of the bumper bar in parallel relation to the bed bottom 16 while the forward ends of the bumper bar are fixed to the fenders 13 in the described relation and manner and the bracket plates 29 are fixed to the supporting beams 17. The forward bracket portions are connected to the bar-engaging rearward end portions thereof by oblique portions 29" having their top edges extending from the inner edge of the upper bar flanges 25. The described mounting of the bumper bar on the vehicle body is essentially such that the bumper bar may be used as a step, or mount step plates, at a level below the bed bottom 16 and at a convenient step-up distance from the ground which is determined by the under line of the fenders 13 and the vertical thickness of the bar, while the bumper bar sides fully protect the rear bottom portions of the fenders in the previously noted manner.

Brace plates 30 extend upwardly from the bar sides 23, said plates being mutually coplanar and having their opposed edges 30' formed to closely and complementarily receive the rearmost portion of the body 12 between them and at the rearward sides of exterior body stakesockets 18, or other exterior body elements, to which their top points are attachable by bolts 31 extending through openings 31' at top points of the plates 30. The plates are generally triangular, and have oblique outer beaded edges 30". These brace plate elements of the bumper assembly are fixedly secured at their bottoms to the upper bar flanges 25 whereby they comprise an integral portion of a bumper unit otherwise comprising the bumper bar 22 and the brackets 29. As particularly shown, one or both of the plates 30 may mount a housing 32 for a taillight, said housing being provided with a side opening 32' for the projection of light therefrom upon a license plate mounted in a frame 33 suitably mounted beside it.

Side step-plates 34 may be mounted on the bumper bar between its side portions 23 and the bracket plates 31, and extend forwardly from the bar to curved edges 34' thereof for complementarily receiving the rear faces of the fenders 13 adjacent them, a suitable cushion strip 35 of resilient material being preferably provided in retainedly gripped engagement between the edges 34' and the fenders. Preferably, and as shown, the step plates 34 are flush with the top bar flange 25 and are conveniently welded thereto and to the bracket plates 31 along their lines of abutment with the flange and plates for securing them in place.

Intermediately thereof, the web 27 of the rear bumper bar portion 24 is provided a slot 37 for receiving therethrough the tongue of a trailer to be attached to the unit. As is particularly brought out in Figure 3, fillet pieces 38 are secured at the corners defined by the bar flanges above and below the slot 37, and these members and the flanges 25 and 26 are provided with mutually aligned holes 39 for receiving a pin 40 by which a trailer tongue (not shown) may be hingedly attached to the bumper bar; if desired, the head of the pin 40 may provide the ball of a ball-and-socket hitch. It will be understood that the fillets 38 extend beyond the ends of the slot 37 and are welded to the bar web and flanges for stiffening the bar thereat. The present arrangement for securing a tongue of a trailing vehicle to the bumper is understood to in no way interfere with the functioning of the bumper, or its use as a support by a person seeking access to the vehicle bed 12.

It will now be noted that the bumper space between the support brackets 31 may be left open, particularly if the tail gate 15 is of the illustrated drop type for its opening when access to the space of the body 12 is desired. If, however, facilitated access to the body is desired while the tail gate 15 remains in place or is completely removed, a step plate 42 is preferably provided between the brackets 31. As particularly shown, the step plate 42 comprises one portion of a member 43 comprising an angle plate which is arranged to have its other portion 44 extended upwardly as a closure between the opposed bottom edge portions of the brace plates 33 and the bed bottom to prevent the rearward throwing of mud or dirt upon the step by the vehicle wheels and also serve as a step riser at the forward step edge.

The step plate portion 42 is installed forwardly of the upper bar flange 25 in flush relation therewith and in coplanar relation with the side step plates 32, the member 43 being conveniently secured by welding at its rear edge to the opposed edge of the upper bar flange. In this manner, the present unit may provide a step support extending around the rear of the bed 12 and between the fenders 13, the tread face cooperatively provided by the top bar flange 25 and the side step plates 34 and the rear step plate 42 being continuous except where the brackets 29 extend upwardly at opposite ends of the step plate 42.

As particularly shown, the upstanding portion 44 of the member 43 is utilized for mounting the license frame 33 for the illumination of a license plate therein from the tail-light housing opening 32', it being noted that the mounting of the tail-light and license on the unit disposes these necessary accessories at fully protected locations rather than at the usual generally unprotected places at the rear of a truck. Also, the portions 42 and 44 are respectively provided with appropriately-located slots 45 and 46 for receiving therethrough a bar 19 of a tire-supporting frame (not shown) beneath the rear end of the bed 12 and the various unit parts. Preferably, and as shown, the upper faces of the side and intermediate step plates 32 and 42 respectively are suitably scored and roughened to provide non-skid tread surfaces thereat, and the rear faces of the brace plates 30 and the riser plate 44 are particularly shown as having the same finish as the upper faces of the step plates whereby these elements of a complete present unit may be conveniently formed of the same sheet material of which the step plates are formed.

Understanding that the present bumper-step units are arranged for pre-fabrication for their fitted mounting on truck bodies having different rear structures and sizes, it will be particularly noted that the present primary structural elements of a unit comprising the bumper bar 22 and the bracket plates 29 and the brace plates 30 and the side step plates 34 and the members 43 providing the rear step plate 42, may be individually formed to functionally fit a given truck body and each other, and then be most conveniently fixed together in their order by welding. Furthermore, the fact that a present unit is arranged for its fixing to a vehicle body solely and entirely by the use of the bolts 28 securing the forward bumper ends to the fenders and the bolts 29' securing the support brackets 29 to the body frame and the bolts 31 securing the brace plates 30 to the truck body, is a feature of particular present interest because a particularly ready mounting and dismounting of a prefabricated unit with respect to a particular truck body, or like bodies, has been provided for.

From the foregoing description taken in connection with the accompanying drawings, the advantages of the present bumper-and-step and trailer-hitch unit will be readily understood by those skilled in the art to which the invention appertains. While I have described the principles of production and use, together with a form of my invention which I now consider to comprise a preferred embodiment thereof, I desire to have it understood that the showing is primarily illustrative, and that such changes and developments may be made, when desired, as fall within the scope of the following claims.

1. In a rear bumper unit for a truck having a frame-supported body fixedly disposed between rear fenders, a continuous U-shaped rear bumper bar of channel section having its flanges directed inwardly in common planes, the upper flange of the bar sides adjacent their rear ends being formed for their complementary engagement with the exteriors of the opposed fenders while the bottom edges of the fenders rest upon the bottom flange of the bar, means directly fixing the web portions of the positioned rear bar ends to the fenders, and support brackets extending forwardly and upwardly from the rear portion of the bumper bar having forward ends thereof directly fixed to the body frame for a disposal of the lower flange of the bumper bar at the level of said bottom edge of the fender.

2. In a rear bumper-step unit for a truck having a frame-supported body fixedly disposed between rear fenders, a continuous U-shaped bumper bar having the forward ends of its side portions directly fixed to the opposed fenders, support brackets extending forwardly and upwardly from the forward top edge of the cross-portion of the bumper bar in fixed relation thereto and having the forward ends thereof directly and supportingly fixed to the body frame, individual step plates extending solely between the side portions of the bar and the adjacent support brackets and between the cross-portion of the bar and the fenders in the plane of the upper bar flanges, and means unitarily fixing said step plates directly and solely to the bar and bracket members.

3. In a rear bumper-step unit for a truck having a frame-supported body fixedly disposed between rear fenders, a continuous U-shaped bumper bar of channel section for installation with its web upright and having its top flange portions directed inwardly in a common plane and having the forward ends of its sides arranged for disposal opposite the outer sides of the fenders, support brackets extending forwardly and upwardly from the forward edge of the top flange of the cross portion of the bumper bar in fixed relation thereto and having the forward ends thereof arranged for fixing to the body frame, individual step plates extending solely between the side portions of the bar and the adjacent support brackets and between the rear portion of the bar and the fenders, and means unitarily fixing said step plates directly to the bar with their tread faces flush with the top flange of the bar.

4. In a rear bumper unit for a truck having a frame-supported body fixedly disposed between rear fenders and providing sides extending upwardly from a bottom, a U-shaped bumper bar of channel section for installation with its web upright and having its top flange portions directed inwardly in a common plane and having the forward ends of its sides arranged for its releasable fixing to the fenders at outer sides thereof, support brackets extending forwardly and upwardly from the cross portion of the bumper bar in fixed relation thereto and having the forward ends thereof arranged for their releasable fixing to the body frame, generally triangular upright brace plates fixed to the top flange of the bumper bar in mutually coplanar relation and formed to complementarily receive the truck body between opposed upright edges thereof, and means for releasably fixing upper points of the brace plates to the truck body.

5. In combination with a truck having a frame-supported body fixedly disposed between rear fenders, a continuous U-shaped rear bumper bar having the forward ends of its side portions directly and supportingly fixed to the fenders, upright bracket plates extending forwardly and upwardly from the forward top edge of the upper bar flange of the rear portion of the bumper bar in fixed relation to the bar and having the forward ends thereof directly and supportingly fixed to the body frame, a step plate extending solely between said brackets and forwardly of the cross portion of the bar with its tread flush with the top plane of the bar, and means unitarily fixing said step plate directly to the bar and bracket members.

6. In combination with a frame-supported body fixedly disposed between rear fenders, a continuous U-shaped rear bumper bar of channel section installed to extend rearwardly of the body with its web upright and having its top flange portions directed mutually inwardly in a common plane and having the forward ends of its sides arranged for disposal opposite the outer sides of the fenders in attached relation thereto, support brackets extending forwardly and upwardly from the forward top edge of the upper bar flange at the cross portion of the bumper bar in fixed relation to the bar and having the forward ends thereof directly and supportingly fixed to the body frame, individual step plates extending solely between the side portions of the bar and the adjacent support brackets and between the rear portion of the bar and the fenders, a step plate extending solely between said brackets and forwardly of the cross portion of the bar to a point beneath the rear body end, and means unitarily fixing said step plates directly to the bar and bracket members with their tread faces flush with the top flange of the bar.

7. In combination with a truck having a frame-supported body fixedly disposed between rear fenders, a continuous U-shaped rear bumper bar having the forward ends of its side portions directly and supportingly fixed to the fenders, upright bracket plates extending forwardly and upwardly from the forward top edge of the upper bar flange at the rear portion of the bumper bar in fixed relation thereto and having the forward ends thereof directly and supportingly fixed to the body frame, a one-piece angle plate having one flange thereof providing a step plate extending solely between said brackets and forwardly of the cross portion of the bar and having its other flange upright and extending solely between said brackets to the under side of the truck body, and means unitarily fixing said angle plate directly to the bar and bracket members.

8. In combination with a truck having a frame-supported body fixedly disposed between rear fenders and providing sides extending upwardly from a bottom, a U-shaped rear bumper bar of channel section installed with its web upright and having its top flange portions directed inwardly in a common plane and having the forward ends of its sides arranged for fixed attachment to the fenders at outer sides thereof, support brackets extending forwardly and upwardly from the cross portion of the bumper bar in fixed relation thereto and having the forward ends thereof fixed to the body frame, upright and mutually coplanar brace plates fixed to and between the top flange of the bumper bar and brackets and complementarily receiving the truck body between opposed edges thereof adjacent its rear end, a one-piece angle plate having one flange thereof providing a step plate extending solely between said brackets and forwardly of the cross portion of the bar and having its other flange extending solely between said brackets in the plane of the brace plates in end abutment with the brackets and brace plates, and means unitarily fixing said brace plates and angle plate directly to the bar and bracket members.

9. In a rear bumper unit for a truck having a frame-supported body fixedly disposed between rear fenders, a one-piece U-shaped rear bumper bar of channel section for installation with its web upright and having its flange portions directed inwardly in common planes and having the forward ends of its sides arranged for disposal opposite the fenders, support brackets extending forwardly and upwardly from the cross portion of the bumper bar in fixed relation thereto and having the forward ends thereof arranged for fixing to the body frame, an elongated opening provided intermediately in and along the web of the bar at its cross portion for receiving the forward end of a towing tongue of a trailer or the like, and a pin engaged through the bar flanges for engaging a trailer tongue extending through the web opening to attach the tongue to the bar in the central plane of the bar.

WILLIAM E. BICE, Jr.

References Cited in the file of this patent

UNITED STATES PATENTS

| Number | Name | Date |
|---|---|---|
| 2,452,785 | Olney | Nov. 2, 1948 |
| 2,476,814 | Carmack et al. | July 19, 1949 |
| 2,492,914 | Barden | Dec. 27, 1949 |